(12) United States Patent
Commeau

(10) Patent No.: US 12,465,975 B2
(45) Date of Patent: Nov. 11, 2025

(54) PROCESS FOR THE PREPARATION OF PRE-ALLOYED POWDERS FOR DIAMOND TOOLS, AND THE POWDERS SO OBTAINED

(71) Applicant: UMICORE, Brussels (BE)

(72) Inventor: Thierry Commeau, Grenoble (FR)

(73) Assignee: UMICORE, Brussels (BE)

( * ) Notice: Subject to any disclaimer, the term of this patent is extended or adjusted under 35 U.S.C. 154(b) by 831 days.

(21) Appl. No.: 17/765,886

(22) PCT Filed: Sep. 11, 2020

(86) PCT No.: PCT/EP2020/075509
§ 371 (c)(1),
(2) Date: Apr. 1, 2022

(87) PCT Pub. No.: WO2021/063653
PCT Pub. Date: Apr. 8, 2021

(65) Prior Publication Data
US 2022/0379376 A1    Dec. 1, 2022

(30) Foreign Application Priority Data
Oct. 3, 2019   (EP) ..................... 19290101

(51) Int. Cl.
| | | |
|---|---|---|
| *B22F 9/04* | (2006.01) | |
| *C22C 33/02* | (2006.01) | |
| *C22C 38/00* | (2006.01) | |
| *C22C 38/12* | (2006.01) | |
| *C22C 38/16* | (2006.01) | |

(52) U.S. Cl.
CPC ............ *B22F 9/04* (2013.01); *C22C 33/0214* (2013.01); *C22C 33/0278* (2013.01); *C22C 38/002* (2013.01); *C22C 38/12* (2013.01); *C22C 38/16* (2013.01); *B22F 2301/35* (2013.01)

(58) Field of Classification Search
None
See application file for complete search history.

(56) References Cited

U.S. PATENT DOCUMENTS

| | | | | |
|---|---|---|---|---|
| 5,221,322 A | * | 6/1993 | Tokuoka | .................. B22F 9/12 |
| | | | | 75/346 |
| 6,645,452 B1 | * | 11/2003 | Barker | ................. C01G 37/006 |
| | | | | 423/306 |
| 2002/0064638 A1 | | 5/2002 | Araki et al. | |

FOREIGN PATENT DOCUMENTS

| | | |
|---|---|---|
| EP | 1619263 A1 | 1/2006 |
| EP | 3124634 A1 | 2/2017 |
| WO | 9930901 A1 | 6/1999 |

OTHER PUBLICATIONS

IP India: First Examination Report for Indian Patent Application No. 202247024965, mailed Nov. 14, 2024, 6 pages.
ISA/EP; International Search Report and Written Opinion for International Patent Application No. PCT/EP2020/075509 dated Nov. 6, 2020, 12 pages.
Korean Patent Office: Office Action for corresponding Korean Patent Application No. 10-2022-7014800, mailed Mar. 27, 2025, 5 pages.

* cited by examiner

*Primary Examiner* — George Wyszomierski
(74) *Attorney, Agent, or Firm* — Rimon P.C.; Allyn B. Elliott

(57) ABSTRACT

The invention concerns pre-alloyed powders useful for the manufacture of metal-bonded diamond tools. A process for the synthesis of such powders is presented, characterized in that at least a major part of the phosphor is introduced by adding an aqueous solution of a phosphorus salt to one or more of the metal-bearing compounds. The powder can have a low cobalt content, or even be cobalt-free, yet remain suitable for the production of diamond-loaded segments having harness and bending characteristics approaching or exceeding that of cobalt.

6 Claims, No Drawings

PROCESS FOR THE PREPARATION OF PRE-ALLOYED POWDERS FOR DIAMOND TOOLS, AND THE POWDERS SO OBTAINED

CROSS-REFERENCE TO RELATED APPLICATIONS

This application is a U.S. National Stage application of International Patent Application No. PCT/EP2020/075509, filed on Sep. 11, 2020, which claims the benefit of European Patent Application No. 19290101.5, filed on Oct. 3, 2019.

The present invention concerns pre-alloyed powders useful for the manufacture of metal-bonded diamond tools. Such tools are equipped with diamond-loaded segments, which play an essential role in many industrial applications dealing with grinding, sawing, drilling and cutting.

To prepare the diamond-loaded segments, diamonds are mixed with metallic bond materials, and the mixture is loaded into molds. After cold or hot pressing, diamond segments are formed. The metal bond has two basic functions: bonding the diamonds to the body of the segment, and wearing along with the diamonds to let new sharp diamonds be exposed properly.

The quality benchmark for metal-bonding powders is represented by powders consisting of cobalt. Cobalt is however an expensive metal, and this has triggered the development of powder mixtures or of pre-alloyed powders having a lower cobalt content. Pre-alloyed powders, which comprise several metals that are intimately mixed at the atomic level, have proven particularly successful. However, most such powders either still contain a significant amount of cobalt, such as more than 10% by weight, or else present somewhat degraded performances compared to cobalt.

The purpose of the present development is to produce pre-alloyed powders with a cobalt content of less than 10% by weight, preferably of less than 5%, which are nevertheless suitable to produce diamond-loaded segments having harness and bending characteristics approaching or exceeding that of cobalt.

The composition of this new powder must include at least iron, copper, phosphorus, and one or both of molybdenum and tungsten. A new method for preparing this powder is disclosed.

In a first embodiment, a process is described for the synthesis of pre-alloyed powders for the manufacture of diamond tools, comprising the steps of:
preparation of a precursor mixture of P-bearing and metal-bearing compounds in solid form containing one or more of Fe, Cu, Ni, Co, Sn, P, Mo, W, wherein the relative metallic concentrations are selected so as to obtain a pre-alloyed powder according to the formula $Fe_aCu_bNi_cCo_dSn_ePf_Mo_gW_h$, with, in weight %:
$a>50$, $5<b<25$, $c<20$, $d<5$, $e<5$, $0.5<f<5$, $0.5<g+h<5$, and $a+b+c+d+e+f+g+h>95\%$;
hydrogen reduction of the precursor mixture;
comminution of the reduced precursor mixture, thereby obtaining a pre-alloyed powder;
characterized in that at least a major part of the phosphorus is introduced by adding an aqueous solution of a phosphorus salt to one or more of the metal-bearing compounds or, preferably, to their mixture. By 'major part' is meant: more than 50% by weight of the added phosphorus.

In a preferred embodiment, the phosphorus salt is diammonium hydrogen phosphate.

In a preferred embodiment at least a major part of the added Mo, and at least the major part of the added W, are introduced by adding an aqueous solution of their respective salts to one or more of the metal hydroxides or to their mixture.

By 'major part' is meant: more than 50% by weight of the added Mo and/or W.

In a preferred embodiment the Mo salt is ammonium dimolybdate, and/or the W salt is ammonium metatungstate.

In a preferred embodiment the metal bearing compounds of Fe and Cu are oxides, hydroxides, carbonates, oxalates, or a mixture of these compounds.

In a preferred embodiment, the one or more of the metal-bearing compounds or their mixture to which the aqueous solution of the phosphorous salt is added, contain both the major part of the Fe and the major part of the Cu which are present in the mixture of metal-bearing compounds in solid form.

In a preferred embodiment, the one or more of the metal-bearing compounds or their mixture to which the aqueous solution of the salts of Mo and/or W are added, contain both the major part of the Fe and the major part of the Cu which are present in the mixture of metal-bearing compounds in solid form.

By 'major part' is meant: more than 50% by weight of the Fe and Cu.

In a preferred embodiment the preparation of the precursor mixture is a preparation of a precursor mixture of P-bearing and metal-bearing compounds in solid form containing one or more of Fe, Cu, Ni, Co, Sn, P, Mo, W, and A, whereby A represents one or more elements having a Gibbs free energy of oxidation at 700° C. which is lower than the Gibbs free energy of oxidation of Mo at 700° C., whereby the relative metallic concentrations are selected so as to obtain a pre-alloyed powder according to the formula $Fe_aCu_bNi_cCo_dSn_eP_fMo_gW_hA_xO_y$, with, in weight %: $a>50$, $5<b<25$, $c<20$, $d<5$, $e<5$, $0.5<f<5$, $0.5<g+h<5$, $x+y<5$, and $a+b+c+d+e+f+g+h+x+y=100$.

The invention further concerns the pre-alloyed powder obtainable according to any of the above-described processes, whereby preferably the pre-alloyed powder is Co-free and/or Ni-free.

The invention further concerns a metal powder according to the formula $Fe_aCu_bNi_cCo_dSn_eP_fMo_gW_hA_xO_y$, with, in weight %,
$a>50$, $5<b<25$, $c<20$, $d<5$, $e<5$, $0.5<f<5$, $0.5<g+h<5$, $x+y<5$, and $a+b+c+d+e+f+g+h+x+y=100$; whereby A represents one or more elements having a Gibbs free energy of oxidation at 700° C. which is lower than the Gibbs free energy of oxidation of Mo at 700° C.

The elements A are elements that, in practice, can not be reduced under hydrogen during manufacture of the metal powder, and will therefore be present in the metal powder as oxides of these elements. Such elements are in general undesirable, although a low content of such elements, considered to be impurities, is acceptable.

Such a metal powder is particularly suited for manufacturing segments for diamond tools, because it has suitable sintering characteristics for this application and results in metal pieces having properties that are suitable for this application.

In a preferred embodiment. The metal powder is a plurality of metal particles, whereby a major part of the individual metal particles comprises Fe and Cu and P and one or both of Mo and W. By 'major part' is meant: more than 50% by weight of the metal particles.

This means that the major elements, being Fe and Cu and P and one or both of Mo and W, of the powder are already present in most of the individual metal particles, so that there are limited or no diffusion distances for the elements during sintering, resulting in an quick achievement of a homogeneous composition throughout the sintered metal pieces. In other words, the metal powder is a pre-alloyed metal powder.

The invention further concerns a precursor for preparing a metal powder, whereby the precursor comprises one or more P-bearing compounds wherein P is present in an oxidised state, whereby the precursor comprises metal-bearing compounds bearing Fe, Cu and one or both of Mo and W, whereby the Fe, Cu and one or both of Mo and W are present in the metal bearing compounds in an oxidised state.

Such a precursor is particularly suitable for the production of the aforementioned metal powder by means of hydrogen reduction.

In a preferred embodiment the one or more P-bearing compounds comprise diammonium hydrogen phosphate.

In a preferred embodiment the metal bearing compounds comprise ammonium dimolybdate and/or ammonium metatungstate.

In a preferred embodiment the metal bearing compounds comprise Fe-oxide, -hydroxide, -oxyhydroxide, -carbonate, and/or -oxalate and whereby the metal bearing compounds comprise Cu-oxide, -hydroxide, -oxyhydroxide, -carbonate, and/or -oxalate.

Such Cu- and Fe-bearing compounds can be easily and cheaply prepared by precipitation, and ammonium dimolybdate, ammonium metatungstate and diammonium hydrogen phosphate are water-soluble and leave no residue besides the desired P, Mo and/or W after reduction treatment at elevated temperature, so that they can be easily added to, and intimately mixed with, the Cu- and Fe-bearing compounds in a dissolved state followed by drying, e.g. spray drying.

In a preferred embodiment of the precursor, the precursor optionally contains Ni and/or Co and/or Sn, whereby: i is the weight based concentration of Fe in the precursor divided by the total weight based concentrations of Fe, Cu, Ni, Co, Sn, P, Mo, and W in the precursor,
  j is the weight based concentration of Cu in the precursor divided by the total weight based concentrations of Fe, Cu, Ni, Co, Sn, P, Mo, and W in the precursor,
  k is the weight based concentration of Ni in the precursor divided by the total weight based concentrations of Fe, Cu, Ni, Co, Sn, P, Mo, and W in the precursor,
  l is the weight based concentration of Co in the precursor divided by the total weight based concentrations of Fe, Cu, Ni, Co, Sn, P, Mo, and W in the precursor,
  m is the weight based concentration of Sn in the precursor divided by the total weight based concentrations of Fe, Cu, Ni, Co, Sn, P, Mo, and W in the precursor,
  n is the weight based concentration of P in the precursor divided by the total weight based concentrations of Fe, Cu, Ni, Co, Sn, P, Mo, and W in the precursor,
  o is the weight based concentration of Mo in the precursor divided by the total weight based concentrations of Fe, Cu, Ni, Co, Sn, P, Mo, and W in the precursor,
  p is the weight based concentration of W in the precursor divided by the total weight based concentrations of Fe, Cu, Ni, Co, Sn, P, Mo, and W in the precursor,
  whereby i, j, k, l, m, n, o and p are expressed as percentages, whereby
  $i>50$, $5<j<25$, $k<20$, $l<5$, $m<5$, $0.5<n<5$, $0.5<o+p<5$, and $i+j+k+l+m+n+o+p=100$.

The invention further concerns method for manufacturing a pre-alloyed powder for the manufacture of diamond tools, comprising the steps of:

step 1: preparation of a precursor, whereby the precursor comprises a mixture of metal-bearing compounds in solid form, whereby the metal-bearing compounds contain Fe and Cu and one or both of Mo and W and whereby the precursor contains a P-bearing precursor;

step 2: reduction of the precursor in a hydrogen atmosphere.

The invention also concerns a metal powder obtainable by this method.

In a preferred variant the method also comprises, after step 2, step 3: comminution of the reduced precursor, thereby obtaining the pre-alloyed powder.

In a preferred variant step 1 comprises the following sub-steps:
  sub-step 1A: preparation of a first intermediate product comprising a mixture of metal-bearing compounds, whereby the metal-bearing compounds in the first mixture contain Fe and Cu;
  sub-step 1B: mixing of the first precursor with an aqueous solution of a P-containing salt and/or of a Mo-containing salt and/or of a W-containing salt to form a suspension and drying the suspension.

In a preferred variant, in sub-step 1B the first precursor is mixed with an aqueous solution of a P-containing salt and of one or both of a Mo-containing salt and a W-containing salt.

In a preferred variant the metal-bearing compounds in the first mixture comprise Fe-oxide, -hydroxide, -oxyhydroxide, -carbonate, and/or -oxalate and whereby the metal bearing compounds comprise Cu-oxide, -hydroxide, -oxyhydroxide, -carbonate, and/or -oxalate.

In a preferred variant the P-containing salt is diammonium hydrogen phosphate.

In a preferred variant the Mo-containing salt is ammonium dimolybdate.

In a preferred variant the W-containing salt is ammonium dimolybdate is ammonium metatungstate.

In a preferred variant the precursor optionally contains Ni and/or Co and/or Sn, whereby:
  i is the weight based concentration of Fe in the precursor divided by the total weight based concentrations of Fe, Cu, Ni, Co, Sn, P, Mo, and W in the precursor,
  j is the weight based concentration of Cu in the precursor divided by the total weight based concentrations of Fe, Cu, Ni, Co, Sn, P, Mo, and W in the precursor,
  k is the weight based concentration of Ni in the precursor divided by the total weight based concentrations of Fe, Cu, Ni, Co, Sn, P, Mo, and W in the precursor,
  l is the weight based concentration of Co in the precursor divided by the total weight based concentrations of Fe, Cu, Ni, Co, Sn, P, Mo, and W in the precursor,
  m is the weight based concentration of Sn in the precursor divided by the total weight based concentrations of Fe, Cu, Ni, Co, Sn, P, Mo, and W in the precursor,
  n is the weight based concentration of P in the precursor divided by the total weight based concentrations of Fe, Cu, Ni, Co, Sn, P, Mo, and W in the precursor,
  o is the weight based concentration of Mo in the precursor divided by the total weight based concentrations of Fe, Cu, Ni, Co, Sn, P, Mo, and W in the precursor,
  p is the weight based concentration of W in the precursor divided by the total weight based concentrations of Fe, Cu, Ni, Co, Sn, P, Mo, and W in the precursor,
  whereby i, j, k, l, m, n, o and p are expressed as percentages, whereby
  $i>50$, $5<j<25$, $k<20$, $l<5$, $m<5$, $0.5<n<5$, $0.5<o+p<5$, and $i+j+k+l+m+n+o+p=100$.

In a preferred variant of the method the pre-alloyed powder is a metal powder according to the invention, whereby preferably the precursor contains at least a major part of the phosphorus in the pre-alloyed powder.

By 'major part' is meant: more than 50% by weight of the phosphorus present in the pre-alloyed powder.

In further preferred embodiments, the pre-alloyed powder has either one or more of:
- a copper concentration between 8 and 12% by weight;
- a powder Fisher size of less than 10 μm; and,
- an oxygen content of less than 1.5% by weight.

The mixture of metal-bearing compounds in solid form may be derived from different precursors such as hydroxide, oxide, oxalate, or carbonate of at least Fe and Cu. These precursors can be prepared starting from metal chlorides and precipitated with sodium hydroxide. The sodium chloride resulting from the precipitation may be eliminated by washing the precipitate with distilled water in a filter press. Other alloying elements can then be added. This mixture can be spray-dried and subjected to a step of high temperature reduction under hydrogen. As some aggregation occurs during reduction, the resulting product is crushed and sieved so as to obtain a fine powder.

The invention describes a specific process for adding phosphorus, and optionally for adding molybdenum and/or tungsten, to the compounds in solid form.

The specific addition process for phosphorus leads to enhanced properties, such as hardness, close to that of cobalt.

Another advantage of the obtained pre-alloyed fine powder is the synergetic role of molybdenum and phosphorus on the mechanical properties. The specific addition process, i.e. adding both elements in an impregnation solution to the solids, makes it possible to obtain sintered parts either by free sintering in a temperature range of 850 to 1000° C., or by hot press at 800° C. or more.

The invention achieves the perfect dispersion of phosphorus, thus creating various iron phosphides (Fe3P or Fe2P), and, when molybdenum is present, also (MoP2) or (FexMoyPz), depending on the composition according to the invention. The size of these phases ranges from 200 nm to a few microns, and their hardness ranges from 300 to 800 HV. It is important to note that the simultaneous addition of phosphorus, and optionally of molybdenum and/or tungsten, is thus useful to ensure the best compromise in terms of hardness and resilience.

When the manufacture of diamond beads by free sintering is envisaged, the powder must preferably have a self-brazing character, thus allowing the beads to be mounted on steel tubes or multiwire cords without addition of solder or additional heat treatment.

The role of copper has also been analysed. Its effect is to reduce the melting point, to reduce the hardness, or to be able to form hardening precipitates during cooling or by heat treatment after sintering. For contents between 5 and 15%, copper stabilizes the alfa-iron phase, and thus block the coalescence of this phase during sintering. As an example, with 7% of copper, the average crystallite size measured by Electron Backscatter Diffraction is 1.5 μm; the size is 0.8 μm for 11% of copper, while beyond 15%, the copper network penetrates the ferritic structure and the hardness decreases proportionally with the copper content. The use of elements such as nickel, tin or cobalt in a small proportion in an iron-copper matrix will adjust the properties of the powder. Other additions such as powders of bronze or tungsten carbide may also be used.

Preferably, $x<0.50$, and preferably $x<0.25$.

Higher levels of, in practice unreducible and therefore oxide-forming, elements A will lead to brittleness in the sintered pieces.

Preferably, $y<3.0$ and preferably $y<2.0$.

Higher levels of oxygent may also lead to brittleness in the sintered pieces.

Preferably the ratio $(g+h)/f>0.10$, and preferably $y>0.20$.
Preferably the ratio $(g+h)/f<2.00$, and preferably $y<1.50$.

These ratio's give a general good behaviour, without problems in relation to obtaining sufficient sintered density at a modest temperature, and with a good hardness and flexural properties of the sintered pieces.

Preferably, $(g+h)<3.0$ and preferably $(g+h)<2.5$.

If the contents of Mo and/or W are higher, sufficient densification at acceptable free sintering temperatures is more difficult to obtain.

Preferably, $f<3.0$ and preferably $f<2.5$.

If the content of P is higher, sintered pieces are obtained which are too brittle and which have a hardness which is too high for use in the manufacture of diamond tools. Preferably, the ratio $(g/h)>3.0$, and preferably $>5.0$ and more preferably $h=0$.

The reason for this is that even though Mo and W have similar effects of the properties of the sintered products, reduction of Mo under hydrogen is easier than reduction of W, so that the use of Mo is preferred over the use of W.

EXAMPLE 1

Preparation of a Powder Fe—20% Cu—2% Mo—2% P

A mixture containing respectively 128 g/L and 33 g/L of iron and copper chloride is prepared. This mixture is then added at a rate of 3 L/min to 6.02 L of sodium hydroxide at 300 g/L. The pH is maintained between 9 and 12 and the temperature of the reagents is kept below 80° C. A hydroxide precipitate is obtained, which is filtered and washed with distilled water heated to 60° C. The wet hydroxide is repulped in a solution containing 35 g of ammonium di-molybdate and 82 g of diammonium hydrogen phosphate. This suspension is then dried under air and reduced for 2 hours at 630° C. under a hydrogen flow rate of 300 L/h. The aggregated powder is crushed and sieved. The Fisher particle size is 2.2 μm, and the oxygen content is 0.68% by weight.

EXAMPLE 2

Preparation of a Powder Fe—10% Cu—2% Mo—2% W—1% P

A mixture containing respectively 108 g/L and 13 g/L of iron and copper chlorides is prepared. This chloride mixture is then added at a flow rate of 3 L/min to 8.3 L of sodium hydroxide at 300 g/L. The pH is maintained between 9 and 12 and the temperature of the reagents is kept below 80° C. A hydroxide precipitate is obtained, which is filtered and washed with distilled water heated to 60° C. The wet hydroxide is repulped in a solution containing 41 g of ammonium di-molybdate and 39 g of diammonium meta-tungstate. This suspension is then dried under air and reduced for 5 hours at 680° C. under a hydrogen flow rate of 300 L/h. The aggregated powder is crushed and sieved. The Fisher particle size is 6.8 μm, and the oxygen content is 0.38% by weight.

EXAMPLE 3

Densification of a Powder Fe—10% Cu—2% Mo—2% P

The powder according Example 1 is compressed to 200 MPa so as to obtain 'green' articles, having dimensions 25×10×10 mm. These are free sintered under pure hydrogen for 1 hour at 850, 900, 950 and 1000° C., applying a heating rate of 200° C./h, and followed by natural cooling. Density measurements according to ISO3369 and Vickers hardness determinations according to ISO6507: 2018 are carried out. The results are summarized in Table 1.

TABLE 1

| Sintering temperature (° C.) | Pressure (MPa) | Density | HV10 |
|---|---|---|---|
| 850 | 200 | 7.53 | 231 |
| 900 | 200 | 7.80 | 269 |
| 950 | 200 | 7.85 | 266 |
| 1000 | 200 | 7.84 | 287 |

A temperature of at least 900° C. is needed to obtain dense articles having an optimal harness.

EXAMPLE 4

Effect of Copper on the Composition Fe—Cu-2% Mo—2% P

Three different powders are prepared according to Example 1, to determine the effect of copper on the hardness, as a function of the sintering temperature. The powders are compressed at 200 MPa and then free sintered under hydrogen for 1 h at 900 and 1000° C. The results are summarized in Table 2.

TABLE 2

| Cu (%) | Sintering temperature (° C.) | HV10 |
|---|---|---|
| 5 | 900 | 243 |
|   | 1000 | 282 |
| 10 | 900 | 269 |
|   | 1000 | 266 |
| 20 | 900 | 219 |
|   | 1000 | 255 |

With about 5% of copper, a sintering temperature of 950° C. is required to reach an optimal hardness. This same rather high temperature of 950° C. is required with 20% of copper. Remarkably, with about 10% of copper, more particularly with 8 to 12% of copper, the optimal harness is already obtained at only 900° C., which is advantageous.

EXAMPLE 5

Effect of Mo and P on the Composition Fe—10% Cu—Mo—P

In this example, the hardness and flexural properties of several compositions are compared by varying the concentrations of molybdenum and phosphorus. The copper content is 10%, with iron balancing the composition. Each powder is prepared according to Example 1, compressed at 200 MPa and then free sintered at 900° C. The results are summarized in Table 3.

TABLE 3

| Alloy | Composition Mo (%) | P (%) | Density after sintering at 900° C. | Hardness (HV10) | Bending test (N) |
|---|---|---|---|---|---|
| 1 | Cobalt |  | 8.50 | 237 | 1337 |
| 2 | 0.75 | 1 | 7.80 | 260 | 1353 |
| 6 | 0.75 | 4 | 7.59 | 298 | 1137 |
| 7 | 4 | 1 | 7.92 | 253 | 1516 |
| 8 | 4 | 4 | 7.75 | 303 | 1075 |
| 9 | 2 | 2 | 7.79 | 266 | 1247 |
| 10 | 2 | 1.5 | 7.78 | 252 | 1295 |
| 11 | 2 | 0.5 | 7.85 | 222 | No breaking |
| 12 | 2 | 1 | 7.67 | 220 | 1299 |
| 13 | 0.75 | 0.5 | 7.64 | 196 | No breaking |

The skilled person will have the possibility to optimize the amounts of Mo and P in function of the desired harness and ductility of the end products. The above table can serve as a guide. The versatility offered by matching the characteristics of the product to the intended use is unique and is not available when using pure cobalt powder.

EXAMPLE 6

Comparison with Conventional Powder Blending Process

Three different powders are prepared according to Example 1 and shaped either by free sintering or by hot pressing. These same three compositions are also prepared according to the conventional route, i.e. using a mixture of powders. The powders used are carbonyl iron and standard copper, iron phosphide at 10% by weight of phosphorus, and molybdenum powder, all powders having a Fisher size of 8 µm or less. The results are summarized in Table 4.

TABLE 4

| Case | Composition | Process | Sintering | Density | Hardness (HV10) |
|---|---|---|---|---|---|
| 1 | Fe—Cu10—P2—Mo2 | Powder mixture (Comparative) Ex-ample 1 | Free sintering at 200 MPa & 900° C. | 7.22 | 193 |
|  |  |  |  | 7.79 | 266 |
| 2 | Fe—Cu20—P2—Mo1 | Powder mixture (Comparative) Ex-ample 1 | Hot press sintering at 800° C. | 7.68 | 248 |
|  |  |  |  | 7.79 | 317 |
| 3 | Fe—Cu10—P2—Mo2 | Powder mixture (Comparative) Ex-ample 1 | Hot press sintering at 800° C. | 7.65 | 256 |
|  |  |  |  | 7.70 | 349 |

In the $1^{st}$ case, using free sintering at 900° C., the powder mixing process (Comparative example) delivers a product having a low density, and consequently also a low hardness.

In the $2^{nd}$ and $3^{rd}$ cases, using hot press sintering at 800° C., the powder mixing process (Comparative example) delivers a product having an adequate density, but showing a relatively low hardness comparing to products prepared according to the invention.

In all powders of the examples, the Fe$_3$P-phase was observed by means of XRD.

The process of Example 1, according to the invention, consistently delivers a suitable product.

The invention claimed is:

1. A process for the synthesis of pre-alloyed powders for the manufacture of diamond tools, comprising the steps of:
preparing a precursor mixture of metal-bearing compounds in solid form containing Fe, Cu, P, one or both of Mo and W, and optionally one or more of Ni, Co, and Sn, wherein relative metallic concentrations are selected so as to obtain a pre-alloyed powder according to the formula $Fe_aCu_bNi_cCo_dSn_eP_fMo_gW_h$, with, in weight %, $a>50$, $5<b<25$, $c<20$, $d<5$, $e<5$, $0.5<f<5$, $0.5<g+h<5$, and $a+b+c+d+e+f+g+h>95\%$;
hydrogen reduction of the precursor mixture to obtain a reduced precursor mixture;
comminuting the reduced precursor mixture, thereby obtaining a pre-alloyed powder;
wherein at least a major part of the phosphorus is introduced by adding an aqueous solution of a phosphorus salt to one or more of the metal-bearing compounds or to their mixture.

2. The process according to claim 1, wherein the phosphorus salt is diammonium hydrogen phosphate.

3. The process according to claim 1, wherein the one or more of the metal-bearing compounds or their mixture, to which the aqueous solution of the phosphorous salt is added, contain both the major part of the Fe and the major part of the Cu which are present in the mixture of metal-bearing compounds in solid form.

4. The process according to claim 1, wherein at least a major part of added Mo, and/or at least a major part of added W, are introduced by adding an aqueous solution of their respective salts to one or more of the metal-bearing compounds or to their mixture.

5. The process according to claim 4, wherein the Mo salt is ammonium dimolybdate, and/or the W salt is ammonium metatungstate.

6. The process according to claim 1, wherein the metal bearing compounds of Fe and Cu are oxides, hydroxides, carbonates, oxalates, or a mixture of these compounds.

* * * * *